United States Patent [19]

Bartel et al.

[11] 4,020,703
[45] May 3, 1977

[54] SWING DRIVE, IN PARTICULAR A RECIPROCATING DRIVE FOR MOULDS IN CONTINUOUS CASTING PLANTS

[75] Inventors: Franz Bartel, Vosendorf; Karl Dub, Vienna, both of Austria

[73] Assignee: Vereinigte Osterreichische Eisen- und Stahlwerke-Alpine Montan Aktiengesellschaft, Linz, Austria

[22] Filed: May 15, 1975

[21] Appl. No.: 577,622

[30] Foreign Application Priority Data

June 12, 1974 Austria .............................. 4850/74

[52] U.S. Cl. ............................................... 74/600
[51] Int. Cl.² .......................................... G05G 1/00
[58] Field of Search ..................................... 74/600

[56] References Cited
UNITED STATES PATENTS

| | | |
|---|---|---|
| 2,188,060 | 1/1940 | Robins .................................. 74/600 |
| 2,319,485 | 5/1943 | Alabrune ............................. 74/600 |
| 2,567,974 | 9/1951 | Scott .................................... 74/600 |
| 3,282,218 | 1/1966 | Bauers ................................. 74/600 |

*Primary Examiner*—Samuel Scott
*Assistant Examiner*—Wesley S. Batliff, Jr.
*Attorney, Agent, or Firm*—Brumbaugh, Graves, Donohue & Raymond

[57] ABSTRACT

A swing drive, in particular a reciprocating drive for moulds in continuous casting plants, has a balance beam structure with which a lifting rod actuated by an overhung crank engages. The shaft of the overhung crank is eccentrically mounted in a driving toothed wheel of the swing gear and the crank radius is equal to the distance between the axes of the driving toothed wheel and the crank shaft. The crank shaft is adjustable in the direction of the crank circle and the crank pin is pivotable relative to the axis of the driving toothed wheel.

2 Claims, 3 Drawing Figures

SWING DRIVE, IN PARTICULAR A RECIPROCATING DRIVE FOR MOULDS IN CONTINUOUS CASTING PLANTS

BACKGROUND OF THE INVENTION

The invention relates to a swing drive, in particular a reciprocating drive for moulds in continuous casting plants, wherein the swingable or reciprocating structural member is arranged at one end of a balance beam and the other end of the balance beam engages a lifting rod that is actuated by an overhung crank.

Known swinging means or reciprocating drives of this kind have the disadvantage that an adjustment of the swing- or reciprocating amplitude is complicated and requires various additional devices, such as, for instance, a pivot mechanism for swinging out the upper end of the lifting rod. Such a pivot mechanism influences the position of the balance beam and an adjustment is only possible to a limited extent. Hitherto an adjustment to the zero-position has not been possible with the known means.

A further disadvantage of the known reciprocating drives consists in that the amplitude-adjustment drive is arranged at the structural members which are connected to the upper end of the lifting rod and therefore follows the reciprocating movement during operation.

SUMMARY OF THE INVENTION

The present invention aims at preventing the above described disadvantages and difficulties and has as its object to create a simple and relatively lightly constructed swing or reciprocating drive, which can be brought into the zero-position and which is infinitely variably adjustable from the zero-position to any swing or oscillation amplitude. The adjustment has no influence upon the position of the balance beam and the adjustment mechanism itself does not follow the swinging movement.

According to the invention this object is achieved in that the shaft of the overhung crank is arranged eccentrically in a drive wheel of the swing or reciprocating drive. The crank radius is equal to the distance between the axes of the driving toothed wheel and the crank shaft and the crank shaft is displaceable in the direction of the crank circle so that the crank pin can be swung in and out relative to the axis of the drive wheel for selective adjustment of the zero-position or the effective swing or reciprocation amplitude.

Advantageously, the crank shaft is connected to a helically-toothed segment or is integral with the segment, thus forming one piece. A further tooth segment, which is adjustable parallel to the direction of the axis of the driving toothed wheel, is driven by means of an actuating drive and meshes with the first tooth segment.

According to a preferred embodiment of the invention the second tooth segment can be guided in a bolt arranged in the driving toothed wheel and can be actuated by a pressing plate that is actuated by a spindle.

BRIEF DESCRIPTION OF THE DRAWINGS

The foregoing and further features of the invention shall now be described by way of an example with reference to the accompanying drawings in which FIG. 1 schematically illustrates the construction of the device in a perspective view.

DESCRIPTION OF AN EXEMPLARY EMBODIMENT

Figure 1:
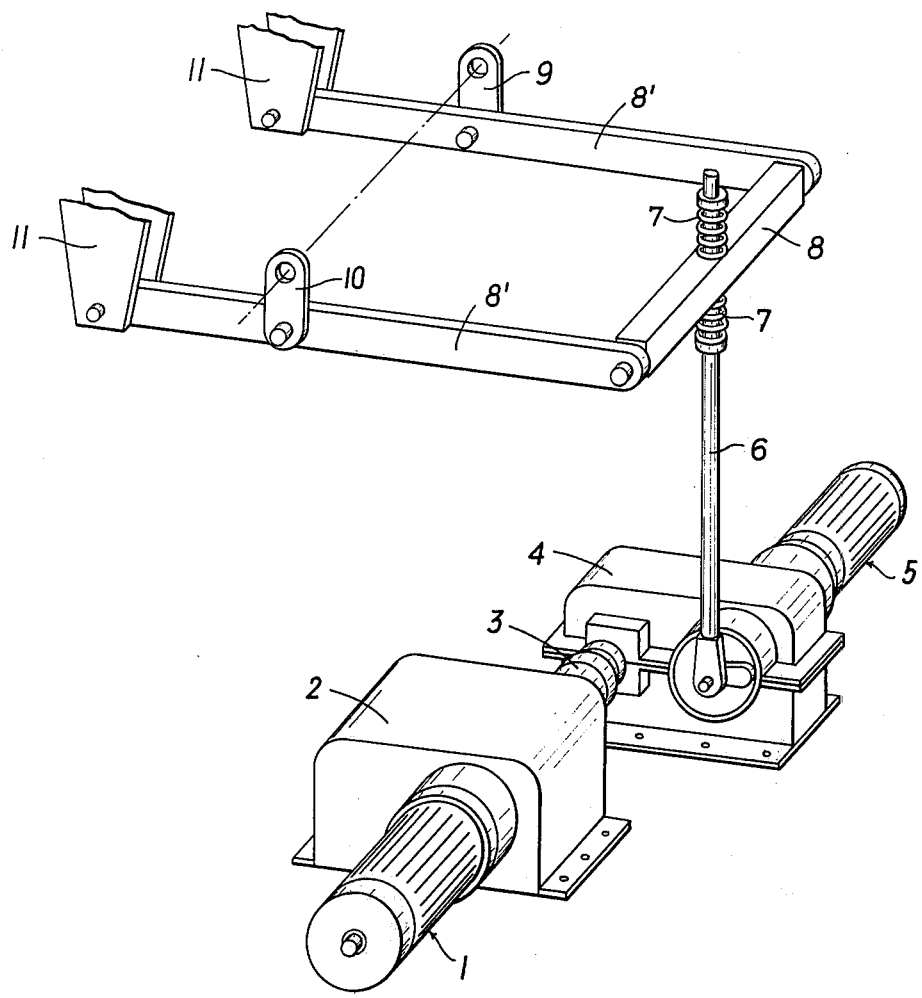

According to FIG. 1, a motor 1 drives a reducing gear 2 which is infinitely variable for controlling the swing or oscillation frequency. The reducing gear 2 is connected with the swing gear 4 via a coupling 3. Swing gear 4 also comprises a stroke-adjustment gear that is driven by motor 5 or by hand. On the swing gear 4 a lifting rod 6 is hinged and is put into a swinging motion in the direction of its longitudinal extension. The upper end of the lifting rod 6 is connected via springs 7, which constitute an overload protection, with balance beam 8 and balance beam pair 8' that are arranged on brackets 9 and 10. The other end of the balance beams 8, 8' is connected to the structural member 11 that is to be put into swinging motions; this can be, for instance, the suspension of a continuous casting mould.

Figure 2:
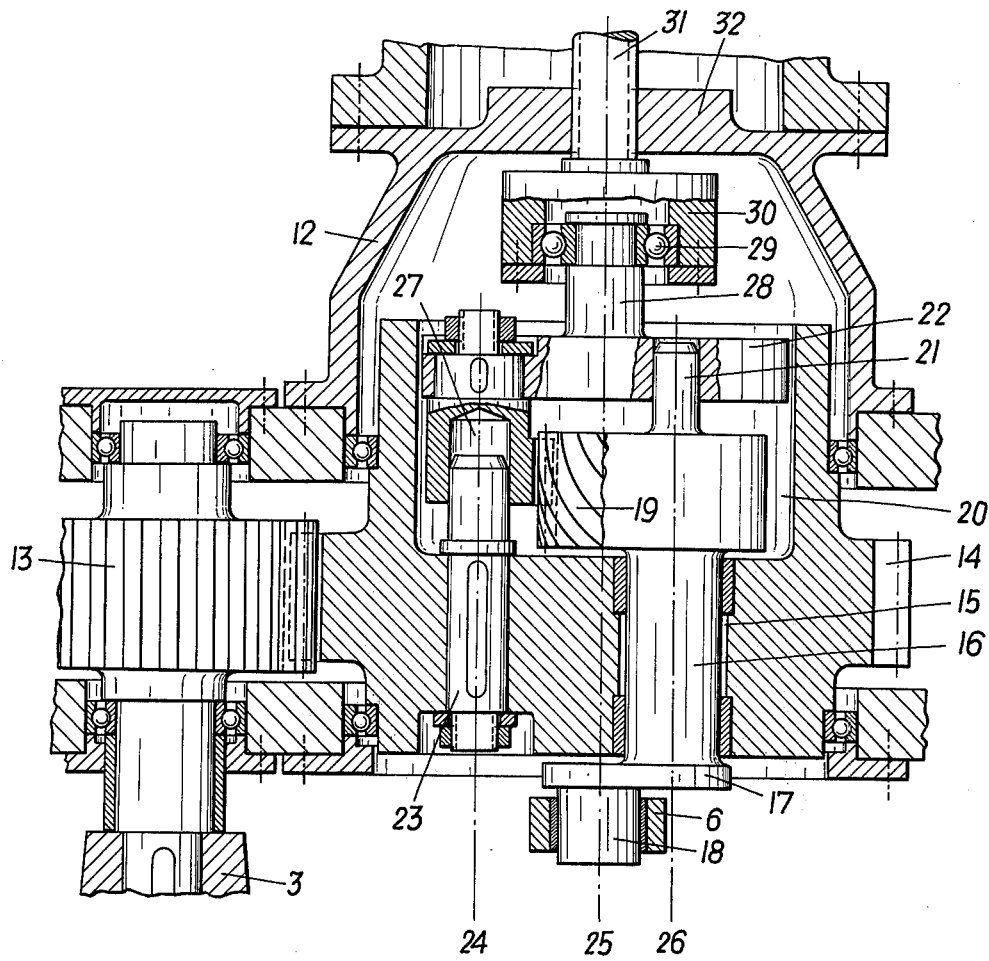
FIG. 2 shows a section through the actual swing or reciprocation drive.

The swing gear 4 shown in FIG. 2 consists of a housing 12 in which a pinion 13 is mounted and is driven by the reducing gear 2 via the coupling 3. The pinion 13 drives the large toothed wheel 14 in the hub of which an eccentric bore 15 is provided. In this bore the crank shaft 16 of the overhung crank, which is in fixed connection with the flange 17 and the crank pin 18, is mounted on. On the crank pin 18 the lifting rod 6 is hinged. The crank shaft 16 is integrally connected with the helically-toothed segment 19 to form a single piece. The tooth segment is also arranged in recess 20 of the driving toothed wheel 14. The other end 21 of the crank shaft 16 is mounted in an axially displaceable plate 22. In a further bore of the hub of the driving toothed wheel 14, a bolt 23 is arranged so that its axis 24 is parallel to the axis 25 of the driving toothed wheel (gear axis) and to the axis 26 of the crank shaft 16. The bolt 23 extends into the recess 20 and serves as a guide for a helically-toothed segment 27 that is displaceable in the direction of the bolt axis 24, which tooth segment 27 meshes with the tooth segment 19 and is connected to the plate 22.

The plate 22 is connected to a pin 28 which is mounted in a ball and roller bearing 29 surrounded by a bell 30. This bell is connected to a pressure spindle 31 which penetrates the lid 32 of the housing 12.

Figure 3:
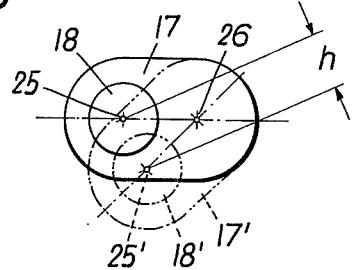
FIG. 3 shows the adjustment of the crank pin axis relative to the swing gear axis.

The device according to the invention functions in the following way:

After the adjustment of the desired swing frequency by means of the reducing gear 2, a certain swing or oscillation amplitude is adjusted. The zero-position, i.e. the amplitude zero results when the crank pin axis 18' coincides with the gear axis or the axis 25 of the driving toothed wheel 14 (see FIG. 3). If the spindle 31 is now activated, the tooth segment 27 is displaced via the pressure plate 22 on the bolt 23 in the direction of the axis of the bolt. This causes the tooth segment 19 to be turned a certain angle due to the helical toothing. This turning can be seen in FIG. 3, in which the position shown in full lines is the zero-position and the position shown in broken lines is the position of the crank pin axis 18' turned by a certain angle relative to the gear axis 25. When the swing drive is in operation, the crank shaft 16 rotates around the gear axis 25, and, depending on the angular position of the crank pin 18, the latter also rotates around the axis 25 which results in variable amplitude heights; a certain adjustment of the amplitude height is denoted with $h$ in FIG. 3.

What we claim is:

1. A reciprocation gear for driving a mould of a continuous casting plant with a swinging motion, said driven mould being mounted at one end of a balance beam and one end of a connecting rod being hinged at the other end of the balance beam, the other end of the connecting rod being connected to said gear, said reciprocation gear comprising:

a driving toothed wheel;

a shaft eccentrically mounted in the driving toothed wheel and having an overhung crank at one end, the connecting rod being attached to the crank by means of a crank pin, the crank radius being equal to the distance between the axes of said driving toothed wheel and said crank shaft;

a first helically-toothed cylindrical member rigidly connected to said shaft;

a second helically-toothed cylindrical member meshing with said first toothed member, said second toothed member being secured against rotation relative to said driving toothed wheel and being adjustable parallel to the axis of said driving toothed wheel; and an actuating drive for moving said second helically-toothed member in its axial direction so as to adjust the crank pin between a position in which it is coaxial with said driving toothed wheel, thereby producing a zero effective crank radius, and a position in which the crank pin axis is displaced from the toothed wheel axis, thereby producing a predetermined effective crank radius.

2. A reciprocation gear as claimed in claim 1 further including:

a bolt secured in said driving toothed wheel, said second toothed member being guided on said bolt, and a pressure plate to which said bolt is rigidly connected, said pressure plate being secured against rotation relative to said driving toothed wheel and coupled in the axial direction with said actuating drive.

* * * * *